United States Patent
Al-Ghamdi et al.

(10) Patent No.: US 9,822,255 B2
(45) Date of Patent: Nov. 21, 2017

(54) METHOD FOR PREPARATION OF A DUAL PHASE FILLER FOR ELASTOMERS

(71) Applicant: King Abdulaziz University, Jeddah (SA)

(72) Inventors: Ahmed A. Al-Ghamdi, Jeddah (SA); Omar A. Al-Hartomy, Jeddah (SA); Falleh R. Al-Solamy, Jeddah (SA); Nikolay Todorov Dishovsky, Sofia (BG); Lako Panov Lakov, Sofia (BG); Petrunka Atanasova Malinova, Sofia (BG)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 27 days.

(21) Appl. No.: 14/952,555

(22) Filed: Nov. 25, 2015

(65) Prior Publication Data

US 2016/0304720 A1   Oct. 20, 2016

(30) Foreign Application Priority Data

Apr. 16, 2015   (BG) ........................................ 111982

(51) Int. Cl.
  *C09C 1/58*   (2006.01)
  *C09C 1/48*   (2006.01)
(52) U.S. Cl.
  CPC ............ *C09C 1/48* (2013.01); *C01P 2002/72* (2013.01); *C01P 2004/04* (2013.01);
  (Continued)
(58) Field of Classification Search
  CPC .............. C01P 2006/12; C01P 2006/14; C01P 2006/16; C01P 2006/19; C09C 1/58
  See application file for complete search history.

(56) References Cited

U.S. PATENT DOCUMENTS

| | | | |
|---|---|---|---|
| 5,830,930 A | 11/1998 | Mahmud et al. |
| 5,919,841 A | 7/1999 | Mahmud et al. |

(Continued)

*Primary Examiner* — Shuangyi Abu Ali
(74) *Attorney, Agent, or Firm* — Birch, Stewart, Kolasch & Birch, LLP

(57) ABSTRACT

A method for preparation of a dual phase filler for elastomers for manufacturing technical rubber items, including such for microwave protection. The method involves the following stages: first stage—1/10 of the silicasol impregnating solution obtained by its dilution in distilled water at a 1:10 ratio is pulverized over the carbon black at constant stirring; second stage—the carbon black pulverized with the silicasol impregnating solution is let stay in air at room temperature for 24 hours; third stage: a two-step thermal activation in a drying cabinet is carried out—at first at 80° C. for 2 hours, and then at 250° C. for 2 hours; fourth stage—9/10 of the impregnating solution that remained from the first stage is pulverized successively over the already impregnated carbon black at constant stirring. It again is let stay for 24 in air at room temperature; fifth stage: a three-step thermal activation in a drying cabinet is carried out—at first at 80° C. for 2 hours, then at 150° C. for 4 hours and finally at 250° C. for 4 hours. The dual phase filler includes $SiO_2$ in amounts 1 to 10% and carbon black 90 to 99%. It has the following parameters: specific surface area /BET/–20-50 $m^2/g$, Iodine adsorption number—15-30 mg/g, Oil absorption number—50-90 ml/100 g, mesopore volume—0.05-0.20 $cm^3(STP)/g$, mesopore diameter—10-20 nm. According to the invention the advantages ensured by the method are in the implementation of a multistage thermal activation at not very high temperature; in yielding improved texture of the dual phase filler obtained and in better insulation of the carbon black aggregates by the silica phase.

3 Claims, 2 Drawing Sheets
(1 of 2 Drawing Sheet(s) Filed in Color)

(52) U.S. Cl.
CPC ...... *C01P 2006/12* (2013.01); *C01P 2006/14* (2013.01); *C01P 2006/16* (2013.01); *C01P 2006/19* (2013.01)

(56) References Cited

U.S. PATENT DOCUMENTS

| | | |
|---|---|---|
| 6,248,808 B1 | 6/2001 | Sone et al. |
| 6,652,641 B2 | 11/2003 | Kawazura |
| 2002/0169242 A1 | 11/2002 | Kawazura |

METHOD FOR PREPARATION OF A DUAL PHASE FILLER FOR ELASTOMERS

FIELD OF THE INVENTION

The invention relates to a method for preparation of a dual phase filler for elastomers which will find application in manufacturing technical rubber items, including such for microwave protection.

PRIOR ART OF THE INVENTION

There is a known method (U.S. Pat. No. 5,830,930) for obtaining dual phase carbon-silica fillers by the so called 'co-fuming' process via which furnace carbon black is obtained in the presence of volatizable silicon-containing compounds. An especially designed reactor is used for the purpose. The dual phase filler thus obtained includes at least one silicon-containing region either at the surface of or within the carbon black aggregate.

The drawbacks of this method are the usage of a special reactor of sophisticated construction, the need of precise control over the feed amounts of the volatizable silicon-containing and volatizable carbon-containing compounds, the high prize of the volatizable silicon-containing compounds and last but not least the toxicity of some of those compounds.

There is a known method (US 20020169242 A1-U.S. Pat. No. 6,652,641 B2) for producing silica-comprising carbon black by addition of water-dispersed silica and an organosilane compound to the former; followed by stirring and granulation on a pin type screw granulator, and modification of the carbon black at a suitable temperature (from 60° C. to 200° C.).

The high price of organosilane compounds, as well as silica's poor dispersibility in water are the shortcomings of the method There is a known method (U.S. Pat. No. 6,248,808) for producing silica-comprising carbon black which is surface treated with silane and/or polysiloxane at a temperature not higher than 200° C. After polysiloxane emulsifying and dispersing wet granulation is carried out in the presence of a surfactant. The granulation is followed by a drying step till the remaining water content is up to 5 wt %.

Shortcomings of the method are the high price of silane and polysiloxane as well as the application of the filler which is limited mainly to reinforcing of siloxane elastomers.

DISCLOSURE OF THE INVENTION

The aim of the invention is to develop a method for obtaining a dual phase carbon black-silica filler which involves a simple technology and equipment and uses available raw materials at a precise control over the ratio between the two phases of the filler.

Another aim of the invention are improved texture characteristics of the dual phase filler and better insulation of its carbon phase by the silica one and particularly better isolation of carbon black aggregates from each other, as well as silica penetration into the very carbon black aggregates.

According to the invention, the method involves development of a silicon dioxide phase by impregnation of carbon black achieved via pulverizing silicasol according to the technique of thin layer chromatography under constant stirring. The method has the following protocol of operations:

First stage: 1/10 of the impregnating silicasol solution needed for introducing a certain amount of silica is pulverized over the carbon black under constant stirring. The silicasol solution is obtained by deluding the solution in distilled water at a 1:10 ratio;

Second stage: the carbon black pulverized with the impregnating solution is let stay in air at ambient temperature for 24 hours;

Third stage: a two-step thermal activation of the impregnated carbon black in a drying chamber at 80° C. for 2 hours and at 250° C. for other 2 hours is carried out;

Fourth stage: 9/10 of the impregnating silicosol solution that remained from the First stage is pulverized over the already impregnated carbon black under constant stirring. The secondary impregnated carbon black is again let stay in air at ambient temperature for 24 hours;

Fifth stage: a three-step thermal activation of the impregnated carbon black at 80° C. for 2 hours, at 150° C. for 4 hours and at 250° C. for other 4 hours is carried out.

According to the invention, the silicasol amount needed to impregnate sufficiently the carbon black is 1.0 to 20.0 ml/100 g carbon black.

The composition of silicasol is $SiO_2$-40%, pH-9 and density 1.3 $g/cm^3$

According to the invention, the dual phase filler obtained by the method subject of the invention contains $SiO_2$ in mass % 1 to 10% and carbon black 90 to 99%.

The dual phase filler obtained by the method has the following parameters: specific surface area /BET/-20-50 $m^2/g$, Iodine adsorption number —15-30 mg/g, Oil absorption number—50-90 ml/100g, mesopore volume—0.05-0.20 $cm^3$ (STP)/g, mesopore diameter—10-20 nm.

The advantages of the present method for production of a dual phase filler for elastomers, if compared to those of known methods, is in using thermal activation at not so high temperature which ensures much improved texture of the filler thus obtained. The mesopore volume of that texture is larger and the availability of micropores in it facilitates a better isolation of carbon black aggregates from each other by the silica phase which is distributed amongst and inside them.

According to the invention, other advantages of the method are the ensured easy and precise control over the ratio between the two phases; the usage of available raw materials, the simplified technology and standard equipment.

The dual phase filler is of defined composition, which could be preset and regulated by introducing a precise amount of the impregnating agent calculated in advance.

Another advantage of the dual phase filler obtained by the method is in the possibility of its direct introduction into the rubber matrix implementing the classical technology and equipment for production and vulcanization of rubber compounds for manufacturing technical rubber items, including such for microwave protection.

EXAMPLES

The invention can be illustrated by the following examples:

Example 1

The carbon black is impregnated with silicasol (silicon content—40%, pH-9 and density-1,3 $g/cm^3$). The impregnation was performed by spaying the carbon black with silicasol according to the method of thin layer chromatography under constant stirring. The amount of silicasol needed for sufficient wetting of the carbon black was 19.23 ml/100 g carbon black. The procedure of impregnating the carbon black involved the following stages:

At the first synthesis stage 1/10 of the silicasol impregnating solution (1.92 ml/100 g) was diluted in distilled water at a 1:10 ratio. The carbon black pulverized with the silicasol impregnating solution was let stay in air at room temperature for 24 hours. The carbon black, thus impregnated underwent a two-step thermal activation in a drying cabinet, at first at 80° C. for 2 hours and then at 250° C. for 2 hours.

At the next stage the remaining 9/10 of the impregnating solution in the amount of 17.31 ml/100 g carbon black was successively pulverized over the already impregnated carbon black at constant stirring. It again was let stay for 24 in air at room temperature.

Then followed another three-step thermal activation in a drying cabinet—at first at 80° C. for 2 hours, then at 150° C. for 4 hours and finally at 250° C. for 4 hours.

The dual phase filler obtained according to Example 1. contained 10% of $SiO_2$ and 90% of carbon black.

Example 2

The procedures order and technological regime were the same as in Example 1. but the amount of silicasol needed for pulverizing the carbon black was 1.92 ml/100 g carbon black. The silicasol amount at the first and fourth stages was 0.19 ml/100 g carbon black and 1.73 ml/100 g carbon black, respectively.

The dual phase filler obtained according to Example 2. contained 1% of $SiO_2$ and 99% of carbon black.

Example 3

The procedures order and technological regime were the same as in Example 1 but the amount of silicasol needed for pulverizing the carbon black was 9.62 ml/100 g carbon black. The silicasol amount at the first and fourth stage was 0.96 ml/100 g carbon black and 8.66 ml/100 g carbon black, respectively.

The dual phase filler obtained according to Example 3. contained 5% of $SiO_2$ and 95% of carbon black.

Example 4

The procedures order and technological regime were the same as in Example 1. but the amount of silicasol needed for pulverizing the carbon black was 13.45 ml/100 g carbon black. The silicasol amount at the first and fourth stage was 1.34 ml/100 g carbon black and 12.11 ml/100 g carbon black, respectively.

The dual phase filler obtained according to Example 4. contained 7% of $SiO_2$ and 93% of carbon black.

The phase distribution in the dual phase filler obtained according to invention was studied and proven by energy dispersive x-ray spectroscopy in a transmission electron microscopy (STEM-EDX).The images generated by high-angle annular dark field scanning transmission electron microscopy show the contrast between the filler phases which results from the different atom number of the elements comprised, thus revealing the phase distribution. Energy dispersive x-ray spectroscopy allows identify these elements and their ratio.

BRIEF DESCRIPTION OF THE DRAWINGS

The patent or application file contains at least one color drawing. Copies of this patent or patent application publication with color drawings will be provided by the USPTO upon request and payment of the necessary fee.

FIGS. 1($a$)-1($d$) present the high-angle annular dark field images of the dual phase filler. The images taken by scanning transmission electron microscopy are in FIGS. 2($a$)-2($d$). FIGS. 3($a$)-3($c$) present the x-ray spectra and the scanned areas.

Figures 1A, 1B:
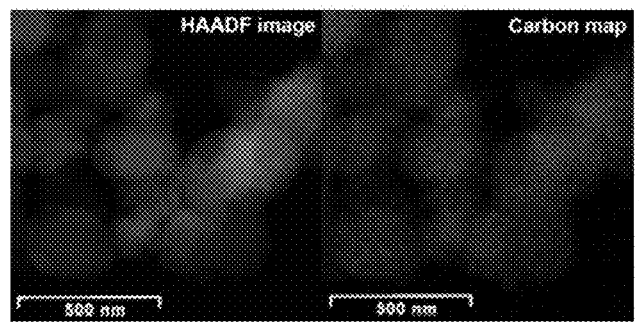
FIGS. 1($a$)-1($d$). High-angle annular dark field images of the dual phase filler: (a) a dual phase filler obtained according to Example 1 of the invention; maps of elements distribution in it: (b) carbon; (c) silica and (d) oxygen.
Figures 1C, 1D:
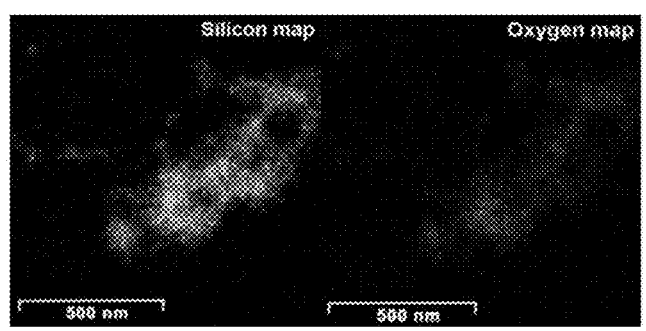
Figures 2A, 2B:
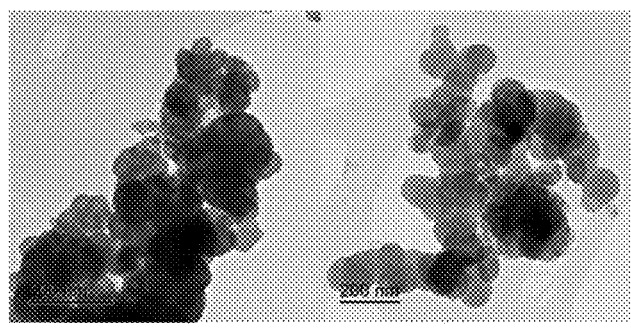
FIGS. 2($a$)-2($d$). TEM images of the dual phase filler obtained according to Example 1. of the invention at different magnifications: a/x 10 000; b, c/x 25000; d/x 250 000
Figures 2C, 2D:
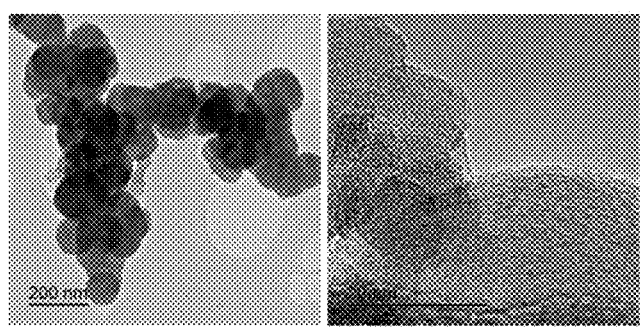
Figure 3A:
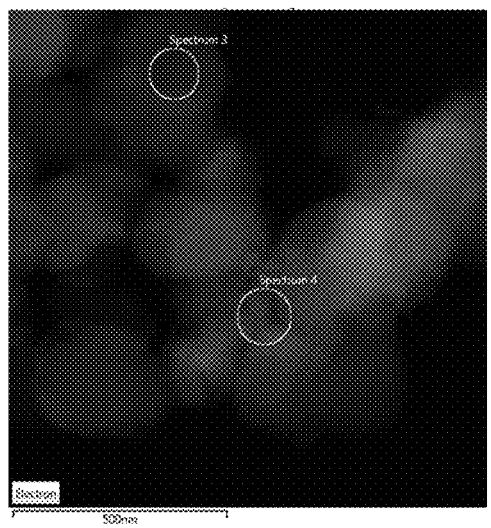
FIGS. 3($a$)-3($c$). Energy dispersive x-ray spectra of a dual phase filler prepared according to Example 1. of the invention: a) scanned areas; b) spectrum 3; c) spectrum 4.
Figure 3B:
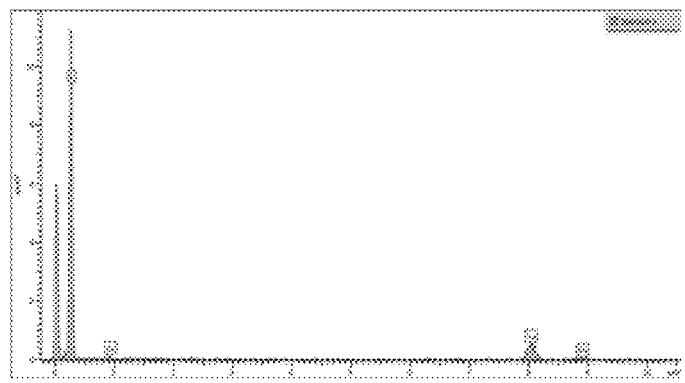
Figure 3C:
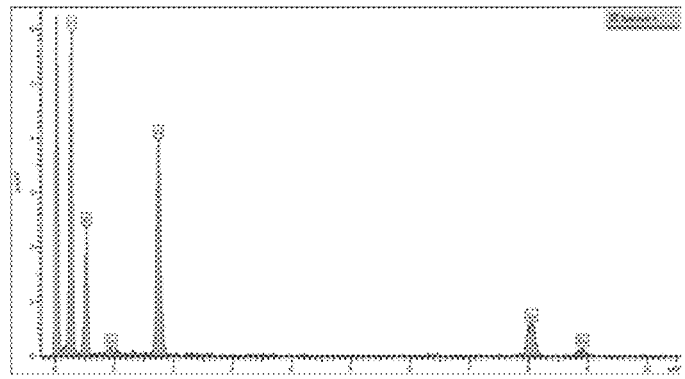

The results presented in FIGS. 1($a$)-1($d$), 2($a$)-2($d$), and 3($a$)-3($c$) prove that the silica particles are mostly distributed over the surface of carbon black aggregates isolating them from each other. In some cases silica particles have also penetrated the aggregates.

The dual phase-filler obtained according to the method has the following characteristic: specific surface area (BET)—20-50 $m^2$/g, iodine number—15-30 mg/g, oil number—50-90 ml/100 g, mesopore volume—0.05-0.20 $cm^3$ (STP)/g, mesopore diameter—10-20 nm.

The dual phase filler obtained according to the invention finds application in manufacturing compositions based on natural and synthetic elastomers used in rubber processing industry for production of technical rubber items, of such for microwave protection, inclusive.

As a result of the method subject to the invention the synthesized dual phase filler is of significantly improved texture characteristics whose clusters are better isolated from each other. That makes the filler applicable in manufacturing of rubber items for microwave protection.

The rubber compounds comprising the dual filler subject of the utility model were prepared on a open two-roll mill (rolls Length/Diameter 320×160 mm, friction 1.27). Slow roll speed was 25 $min^{-1}$.

The rubber had been plasticized on the rolls for 6 min prior to introducing the ingredients.

According to the invention, after the plasticization zinc oxide, stearin and one third of the dual filler were added at the $6^{th}$ minute. Then the second third of the dual filler was added at the $15^{th}$ and the third one—at the $20^{th}$ minute. Sulfur and the accelerator were added at the end. When the rubber matrix absorbed the ingredients, the compound was cut diagonally and the strip was crossed at the opposite end of the roll. The compound was coiled and passed through a narrow nip. The ready compound was taken off the rolls in the form of a sheet at the $25^{th}$ minute and let stay for 24 hours prior to its vulcanization.

The vulcanization was carried out on an electrically heated hydraulic press using a special homemade mold at temperature 150° C. and under pressure of 10 Mpa at the vulcanization optimums determined for each compound on an oscillating disc vulcameter.

The microwave characteristics of the elastomer based composites comprising the dual filler prepared according to Example 1. of the invention, as well as those of the substrate carbon black (given as references) are presented in Table 1.

TABLE 1

Comparative table of the microwave characteristics of
furnace carbon black and dual phase filler prepared
according to Example 1 of the invention at 10 GHz

| Characteristic | Furnace carbon black | Dual phase filler prepared according to the invention |
|---|---|---|
| 1. Absorption, dB/cm | 13 | 15 |
| 2. Reflection coefficient | 0.65 | 0.57 |
| 3. Shielding effectiveness, dB | 7 | 9 |

As seen from Table 1, the composite comprising the filler prepared according to the invention has higher microwave absorption values and lower reflection coefficient values than the substrate carbon black. The microwave shielding effectiveness of the filler is also slightly higher than that of the substrate carbon black.

The invention claimed is:

1. A method for preparing an elastomer reinforcing dual phase filler based on carbon black with introduced silica, wherein the carbon black is pulverized with an impregnating silicasol solution according to a thin layer chromatography technique, said method comprising:
   (1) pulverizing the silicasol over carbon black with constant stirring, wherein said impregnating solution is obtained by spraying carbon black with silicasol in a thin layer chromatography method with constant stirring, wherein the obtained impregnated carbon black is then diluted in distilled water at a 1:10 ratio;
   (2) resting the carbon black pulverized with the silicasol impregnating solution obtained in (1) in air at room temperature for 24 hours;
   (3) performing a two-step thermal activation in a drying cabinet, with a first step being performed at 80° C. for 2 hours, and then a second step being performed at 250° C. for 2 hours;
   (4) successively pulverizing impregnating solution over the already impregnated carbon black with constant stirring;
   (5) resting the carbon black pulverized with the silicasol impregnating solution obtained in (4) for 24 hours in air at room temperature; and
   (6) performing a three-step thermal activation in a drying cabinet, with a first step being performed at 80° C. for 2 hours, a second step being performed at 150° C. for 4 hours and a third step being performed at 250° C. for 4 hours.

2. The method for preparation of a dual phase filler according to claim 1, wherein an amount of silicasol needed for the carbon black impregnation is 1.0-20.0 ml/100 g carbon black.

3. The method for preparation of a dual phase filler according to claim 1, wherein said silicasol comprises $SiO_2$ in an amount of 40% based upon the total amount of silicasol, wherein said silicasol has a pH of 9 and a density of 1.3 g/cm$^3$.

* * * * *